US005621379A

United States Patent [19]

Collins

[11] Patent Number: 5,621,379

[45] Date of Patent: Apr. 15, 1997

[54] TONE DIALING ACTIVATED EMERGENCY LOCATOR SIGNAL LIGHT SYSTEM

[76] Inventor: Sean Collins, 478 Windswept Dr., Asheville, N.C. 28801

[21] Appl. No.: 406,013

[22] Filed: Mar. 16, 1995

[51] Int. Cl.$^{6}$ .............................. G08B 5/00; H04M 11/04

[52] U.S. Cl. .............................. 340/332; 340/331; 340/691; 379/37; 379/386; 379/45; 379/396

[58] Field of Search .............................. 340/332, 331, 340/321, 691, 573; 379/37–45, 58, 386, 396

[56] References Cited

U.S. PATENT DOCUMENTS

| | | | |
|---|---|---|---|
| 3,798,375 | 3/1974 | Delisle . | |
| 4,003,040 | 1/1977 | Browand | 340/332 |
| 4,547,761 | 10/1985 | Jones | 340/332 |
| 4,587,753 | 5/1986 | Harper | 340/331 |
| 4,611,265 | 9/1986 | Davis | 362/812 |
| 4,686,505 | 8/1987 | Vanderburg | 340/331 |
| 4,839,630 | 6/1989 | Miller | 340/331 |
| 4,855,723 | 8/1989 | Fritz et al. | 340/691 |
| 4,878,236 | 10/1989 | Ray et al. | 340/332 |
| 4,931,780 | 6/1990 | LaMont et al. | 340/331 |
| 4,935,951 | 6/1990 | Robinson et al. | 340/332 |
| 4,993,058 | 2/1991 | McMinn et al. | 340/332 |
| 5,012,507 | 4/1991 | Leighton et al. | 379/37 |

*Primary Examiner*—Donnie L. Crosland
*Attorney, Agent, or Firm*—Carter & Schnedler, P.A.

[57] ABSTRACT

An emergency locator signal light system, suitable for installation at a residence or business, which in a monitor mode is responsive to the dialing of a predetermined emergency telephone number, such as "911", to enter a command mode. In the command mode, the system is responsive to predetermined tone dialing signal sequences, which are herein termed "Star Codes", to activate an included signal light device. Exemplary "Star Codes" are "*1" for a medical emergency, whereupon red and white lights alternately flash; "*2" for a fire emergency, whereupon a white light flashes; and "*3" for a police emergency, whereupon blue and white lights alternately flash. The "Star Codes" can be dialed either locally from any telephone set or other dialing device at the residence or business from which the "911" emergency call is placed, or by an emergency telecommunicator who makes a decision to activate the flashing lamps in view of the nature of a particular emergency following a verbal description by an emergency caller.

21 Claims, 9 Drawing Sheets

TONE DIALING ACTIVATED EMERGENCY LOCATOR SIGNAL LIGHT SYSTEM

BACKGROUND OF THE INVENTION

The present invention relates to an emergency locator signal light system, installed for example at a residence, of the general type which is activated by the dialing of an emergency telephone number, such as "911" in the United States.

Centralized emergency response systems are implemented in most communities, with emergency operators or telecommunicators at a central telecommunications center reached by placing a telephone call to a predetermined emergency telephone number, typically having a limited number of digits for convenient dialing. For example, in the United States, a standardized emergency telephone number is "911." Examples for other countries are "111" in New Zealand, "999" in England, and "112" in Germany.

The caller describes the nature of the emergency to the emergency telecommunicator who then either relays the call to an appropriate response center (for example an ambulance service, fire department or police department), or otherwise dispatches emergency help.

In the case of older centralized emergency response systems, it is necessary for the caller to provide an address and instructions to the emergency telecommunicator. Since this takes extra time, and since every minute counts when responding to an emergency, enhanced centralized emergency response systems (e.g. Enhanced 911) have more recently been developed. In an enhanced system, equipment used by the emergency operator or telecommunicator includes a display system, such as a computer screen, which automatically displays the address from which the emergency (e.g. "911") telephone call was placed, as well as other pertinent information. Not only does an enhanced system save time, but it is not strictly necessary for the caller to say anything. In certain dire emergencies nothing is said, but help is nevertheless dispatched on the assumption there is an emergency.

Under optimum conditions, particularly with "Enhanced 911", the address on the screen is correct, the weather is clear, and the street signs and house numbers are clearly marked. Emergency personnel are thus able to proceed efficiently to a given house or other location directly and without delay. Nevertheless, emergency personnel frequently experience difficulties in locating homes and businesses quickly and efficiently in an emergency, due to the nature and variety of homes and their locations.

Even when no particular difficulties arise, a certain amount of time is inherently lost. Thus normally an emergency vehicle driver heads in the direction from which an emergency call originated. When the emergency vehicle arrives in the general area of the call, the driver slows down and begins looking for the correct house number. This is somewhat more time consuming than proceeding directly to an emergency location, and may amount to losing seconds and sometimes minutes, simply because of the need to slow down to begin looking for the correct number.

In some cases, particularly in medical emergency calls when an ambulance has been dispatched, a person is often at the edge of the street waving down the ambulance. Unfortunately, this person is often the only other person at the scene of the call. Standing outside waiting for help to arrive means the person cannot be inside giving help or comfort to whoever is having the medical emergency.

One general prior art approach to these problems is to provide a flashing light system which can be activated by a person inside the house. Examples of various such systems are disclosed in U.S. patents to Browand U.S. Pat. No. 4,003,040; Jones U.S. Pat. No. 4,547,761; Davis U.S. Pat. No. 4,611,265; Vanderburg U.S. Pat. No. 4,686,505; Miller U.S. Pat. No. 4,839,630; and Fritz et al U.S. Pat. No. 4,855,723. Another known system causes a front porch light to blink if the switch for the light is flipped twice. Some of these systems, such as the system of Browand U.S. Pat. No. 4,003,040, allow a person inside the house to selectively activate several different light signalling modes, for example as a continuous white light, a flashing white light, and a flashing red light, to indicate various specific situations.

Such systems are, however, at best inadequate and, at worst, provide a false sense of security for persons in the home. For example, if a person needing help is home alone, and it requires all of the person's energy to call an emergency telephone number such as "911", requiring the person also to flip a switch may result in a call not being placed at all to the emergency telecommunications center.

Accordingly, other systems have been developed which automatically detect the dialing of a predetermined telephone number, such as "911", to initiate a flashing light or other light signal on the exterior of the house or other building. Thus, there is no need for a person to specifically activate the light signal. Examples of such systems are disclosed in the U.S. patents to Ray et al U.S. Pat. No. 4,878,236; LaMont et al U.S. Pat. No. 4,931,780; Robinson et al U.S. Pat. No. 4,935,951; McMinn et al U.S. Pat. No. 4,993,058; and Leighton et al U.S. Pat. No. 5,012,507.

One of the drawbacks of such systems is that there is no way to differentiate based on the nature of the emergency call. By way of example, in the case of a medical emergency, it would generally be useful for neighbors or passersby to be alerted and made aware of the situation, so that assistance might be rendered while waiting for an ambulance. On the other hand, in the case of a police emergency, such as where there is an intruder in the house, neighbors should be warned to exercise caution, or stay away. A distinguishable police emergency signal also could prevent children from coming home from school, or from a friend's house, and walking in on a dangerous situation. As another example, in the case of a fire emergency, it may be useful to alert persons outside the house regarding the general nature of the emergency so that appropriate action might be taken.

SUMMARY OF THE INVENTION

It is a general object of the invention to provide systems for assisting emergency personnel in finding homes and businesses faster than might otherwise be possible.

It is another object of the invention to provide an emergency locator signal light system which automatically recognizes a call to an emergency telephone number, such as "911" in the United States, to enable the flashing of signal lights indicating the general nature of the emergency.

Very briefly, in accordance with an overall aspect of the invention, it is recognized that it would be advantageous to provide a system which allows an emergency telecommunicator or operator to control a locator signal light device which selectively emits a light signal appropriate to the emergency based on information provided by the caller at the scene of the emergency, without requiring the caller to make a judgment and initiate a specific light signal.

In accordance with a more particular aspect of the invention, an emergency locator signal light system, installed for example at an individual residence or business, is connected to a local telephone line. The emergency locator signal light system includes a signal light device, as well as electronic circuitry for driving the signal light device. The electronic circuitry is responsive to dialing signals on the local telephone line (from any telephone set connected to the line) and has at least a monitor mode and a command mode. The electronic circuitry when in the monitor mode is responsive to the dialing of a predetermined telephone number, such as "911", to initiate the command mode. The electronic circuitry when in the command mode is then responsive to a predetermined tone dialing signal sequence to active the signal light source. Preferably, the predetermined tone dialing signal sequence begins with a tone dialing signal corresponding to a non-numerical character, such as the "*" or "star" key on a Touch Tone telephone dial.

For convenience, predetermined tone dialing signal sequences are herein referred to as "Star Codes". By way of example, in one specific implementation Star Code "*1" is dialed to indicate a medical emergency, Star Code "*2" is dialed to indicate a fire emergency, and Star Code "*3" is dialed to indicate a police emergency.

Significantly, the electronic circuitry is responsive to the predetermined tone dialing signal sequence (i.e. Star Code) being generated either by local telephone equipment, such as the caller's telephone set, connected to the telephone line locally with reference to the system, or by remote emergency operator telephone equipment at a remote central location, connected to the telephone line through telephone central office switching equipment.

Preferably, the signal light device is capable of emitting at least two distinct light signals, and the electronic circuitry when in the command mode is selectively responsive to at least two different tone dialing signal sequences corresponding respectively to the at least two distinct light signals to selectively activate the signal light source to emit a corresponding light signal. In one particular embodiment, the signal light device is capable of selectively emitting a light signal comprising blue and white lights flashing alternately in response to a tone dialing signal sequence representing a police alert command, a light signal comprising red and white lights flashing alternately in response to a tone dialing signal sequence representing a medical alert command, and a light signal comprising a flashing white light in response to a tone dialing signal sequence representing a fire alert command.

The emergency locator signal light system may be employed in an overall combination in which an emergency response system includes a publicly accessible switched telephone system, and emergency operator telephone equipment at a center connected for receiving emergency telephone calls through the switched telephone system. Preferably, the emergency operator telephone equipment is enhanced, and includes a display system programmed to alert an emergency operator that a particular telephone subscriber system is equipped with an emergency locator signal light system, in addition to the usual address information. The overall emergency response system further includes a plurality of individual telephone subscriber systems at various subscriber locations. Each of the subscriber systems includes a local telephone line connected to the publicly accessible switched telephone system, local telephone equipment, such as an ordinary telephone set connected to the local telephone line for placing telephone calls, and an emergency locator signal light system as summarized hereinabove.

Particularly for utility in installations where the emergency operator telephone equipment is not enhanced and does not include a display system programmed to alert an emergency operator that a particular telephone subscriber system is equipped with an emergency locator signal light system, the electronic circuitry of each emergency locator signal light system includes a signal tone generator connected to the telephone line to signal the presence of the emergency locator signal light system. In one embodiment, when in the monitor mode, the electronic circuitry is responsive to the dialing of the predetermined telephone number (e.g. "911") to also activate the signal tone generator which produces for example, a brief tone of approximately 1,000 Hertz may be generated every five seconds, to inform the emergency telecommunicator that an emergency locator signal light system is installed. The electronic circuitry when in the command mode is responsive to the predetermined tone dialing sequence to also change the audible characteristics of the signal tone generator. For example, after execution of any "Star Code" command, the tone rate may be reduced from once every five seconds to once every twenty seconds, or the signal tone generator may be turned OFF entirely.

In one embodiment, the signal light device of the emergency locator signal light system includes six flash lamps extending generally in a row. The two end flash lamps are organized as one operational pair, which may be termed an end operational pair. The two flash lamps adjacent to the end flash lamps are organized as another operational pair, which may be termed an intermediate operational pair. The center two flash lamps are organized as yet another operational pair, which may be termed a center operational pair. Two of the operational pairs of flash lamps have colored lenses to distinguish between the operational pairs. In a preferred form, so that illumination from the flash lamps is visible both from in front of the signal light device and from the sides of the signal light device, the signal light device includes a housing having a translucent outer lens which projects farther out over the center operational pair of center two flash lamps than over the intermediate operational pair of flash lamps, and farther out over the intermediate operational pair of flash lamps than over the end operational pair of flash lamps.

In brief summary of the operation, the electronic circuitry within the emergency locator signal light system installed at each individual house or business constantly monitors the local telephone line, looking for emergency calls to the predetermined telephone number, such as "911", which may be from any telephone set in the house or business connected to the local telephone line. Upon recognizing the dialing of the predetermined telephone number, the circuitry changes from monitor mode to command mode. At this point, the emergency locator signal light system activates the signal tone generator, but no signal lights flash while the system is waiting for "Star Codes".

When a telecommunicator at the emergency center answers, the telecommunicator, after ascertaining the nature of the emergency, activates the signal light device by dialing the appropriate "Star Code". Emergency personnel are thus aided in finding the house or business from which the emergency telephone call was placed, and persons outside the house are informed regarding the general nature of the emergency.

In most cases the predetermined emergency telephone number will be dialed from an ordinary telephone set. However, in some installations automatic alarm equipment (e.g. intrusion, fire, or "panic-button" medical emergency) may dial a predetermined telephone number and deliver a recorded message, whereupon a telecommunicator receiving the telephone call can dial an appropriate "Star Code," in addition to taking other appropriate action. Further, it will be appreciated that the predetermined telephone number dialed by the automatic alarm equipment and recognized by the circuitry may be an alarm company telephone number other than "911." Thus the system of the invention may be responsive to more than one predetermined telephone number to initiate the command mode.

In a typical emergency locator signal light system of the invention, the electronic circuitry responds to the dialing of a predetermined telephone number from a tone dialing telephone set which generates dual tone multifrequency (DTMF) tones. However, the electronic circuitry may optionally also respond to rotary dial dialing signals for recognizing the dialing of the predetermined telephone number.

BRIEF DESCRIPTION OF THE DRAWINGS

While the novel features are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
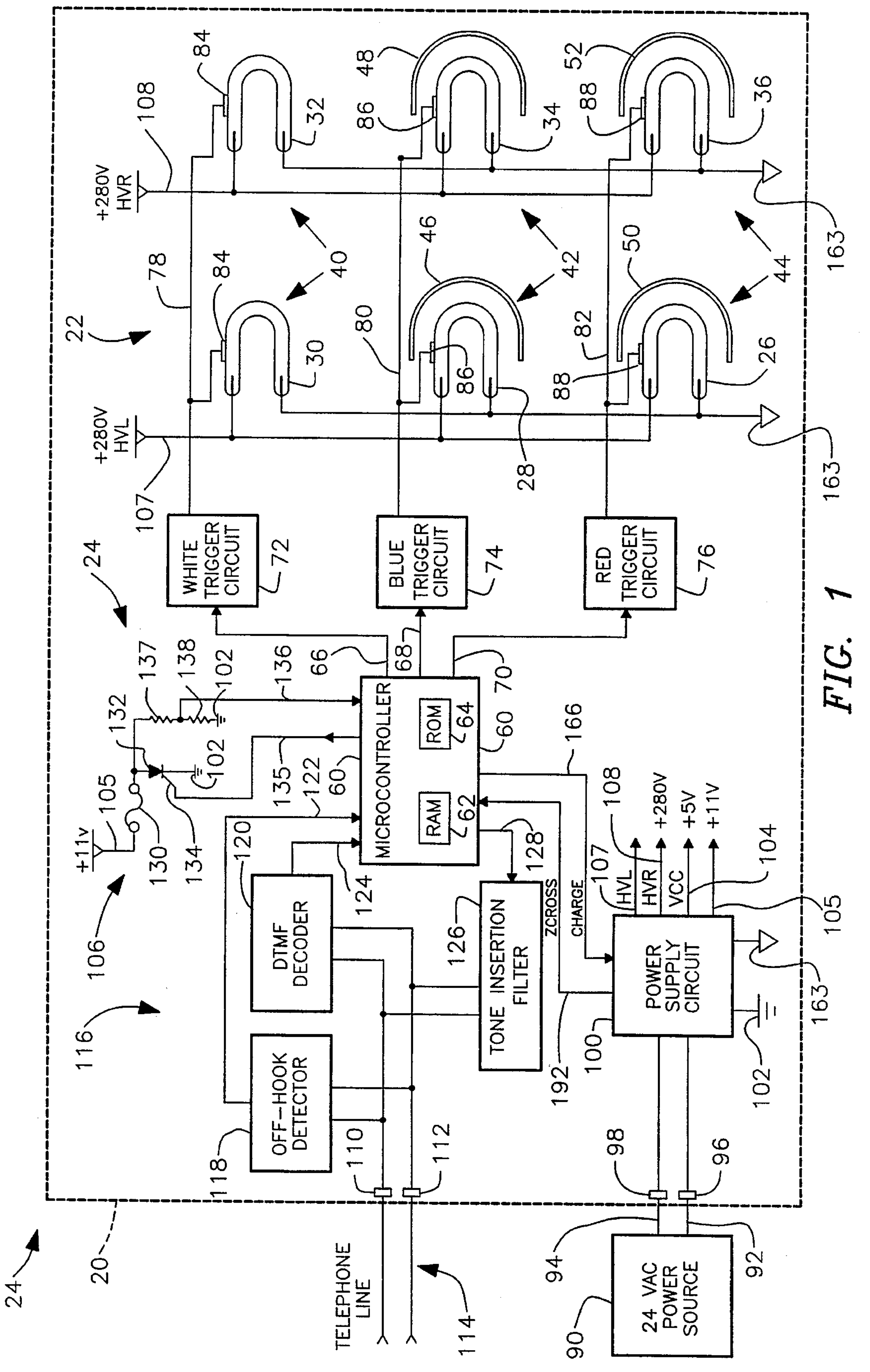
FIG. 1 is an electrical schematic drawing, partially in block diagram form, of an emergency locator signal light system in accordance with the invention.

Referring first to the electrical schematic drawing of FIG. 1, an emergency locator signal light system 20 is preferably, but not necessarily, a self-contained unit incorporating both a signal light device, generally designated 22, and electronic circuitry, generally designated 24. The illustrated signal light device 22 includes six high intensity Xenon flash lamps 26, 28, 30, 32, 34 and 36. These flash lamps are organized in pairs, with lamps 30 and 32 comprising a white pair 40, lamps 28 and 34 comprising a blue pair 42, and lamps 26 and 36 comprising a red pair 44. To produce the colors, representative blue lenses 46 and 48 are schematically placed over the lamps 28 and 34 of the blue pair 42, and representative red lenses 50 and 52 are schematically placed over the lamps 26 and 36 of the red pair 44.

The associated electronic circuitry 24 is microprocessor-based, and includes an appropriate microcontroller 60, having internal RAM 62 and ROM 64 memory, such as a Motorola type No. 6805J1A microcontroller, and output ports 66, 68 and 70 respectively driving the flash lamp pairs 40, 42 and 44 through individual trigger circuits, in particular, a white trigger circuit 72, a blue trigger circuit 74 and a red trigger circuit 76. The trigger circuits 72, 74 and 76 are conventional, and each includes a SCR switching device (not shown) and a Xenon flash lamp trigger transformer (not shown) connected via respective output lines 78, 80 and 82 to trigger terminals 84, 86 and 88 on the flash lamp pairs 40, 42 and 44 so that the two lamps of each pair flash together.

For convenience and ease of installation, the emergency locator signal light system 20 is powered from a Class II external twenty four volt AC power source 90, representative of a small transformer connected to a household AC power line.

The external twenty four volt AC power source 90 is connected via lines 92 and 94 and screw terminal connectors 96 and 98 to a power supply circuit 100 within the system 20, described in greater detail hereinbelow with reference to FIG. 2.

In FIG. 1, the power supply circuit 100 is referenced to circuit ground 102, and supplies four voltage output lines 104, 105, 107 and 108. Line 104 is also designated VCC, and supplies regulated +5 volts DC to most of the electronic circuitry within the system 20, including the microcontroller 60. Line 105 supplies approximately +11 volts DC unregulated for an initialization circuit 106, described hereinbelow. The lines 107 and 108, also respectively designated HVL (high voltage left) and HVR (high voltage right), each supply approximately +280 volts DC, for the Xenon flash lamps 26, 28 and 30, and the Xenon flash lamps 32, 34 and 36. During operation, only one of the flash lamp pairs 40, 42 and 44 is triggered at a time, and the two lamps of a particular flashing pair are respectively individually supplied by HVL and HVR.

The emergency locator signal light system 20 also includes screw terminal connectors 110 and 112 for connection to a local telephone line 114. Within the emergency locator signal light system 20 telephone line interface circuitry, generally designated 116, is connected to the screw terminals 110 and 112, and includes an off-hook detector circuit 118 and a dual tone multifrequency (DTMF) decoder 120, connected to respective input ports 122 and 124 of the microcontroller 60.

The off-hook detector 118 and DTMF decoder 120 are conventional circuits which present appropriate signals to the microcontroller 60. The off-hook detector 118 thus senses voltage or loading on the local telephone line 114 to recognize when local telephone equipment such as a telephone set has gone off hook, such as to place a telephone call. The DTMF decoder 120 decodes tone dialing signals present on the telephone line 114.

To implement a signal tone generator, the telephone line interface circuitry 116 additionally includes a tone insertion filter 126, driven by a microcontroller 60 output port 128. The signal tone generator which introduces a periodic 1000 Hertz tone on the telephone line 114 to inform an emergency telecommunicator regarding the presence of the emergency locator signal light system 20. To this end, the microcontroller 60, by appropriate programming, generates a 1000 Hertz square wave signal on the output port 128, which signal is smoothed somewhat by the tone insertion filter 126, which may comprise a simple RC filter network.

Although not specifically shown in FIG. 1, the telephone line interface circuitry 116 optionally includes a rotary dial pulse detection circuit to detect dialing of the predetermined emergency telephone number such as "911" from a rotary dial telephone set rather than from a tone dialing telephone set. Nevertheless the DTMF decoder 120 is still included. Even though an emergency call may be placed from a rotary dial telephone, DTMF decoding capability is required for sensing "Star Codes" dialed by an emergency telecommunicator to activate the signal light device 22.

Finally, for "remembering" whether the electronic circuitry 24 has been initialized, even though there may be interruption in operating power from the power source 90 such as in the event of a power failure, the electronic circuitry 24 within the emergency locator signal light system 20 preferably additionally includes a 1/16 ampere fuse 130 connected in series with an SCR 132 between the +11 volt DC supply line 105 and circuit ground 102, with the SCR gate terminal 134 driven by an output port 135 of the microcontroller 60. An input port 136 of the microcontroller is connected for sensing whether the fuse 130 is blown or not blown, through a voltage divider comprising resistors 137 and 138 which limit the voltage on input port 136 to less than +5 volts DC.

Figure 2:
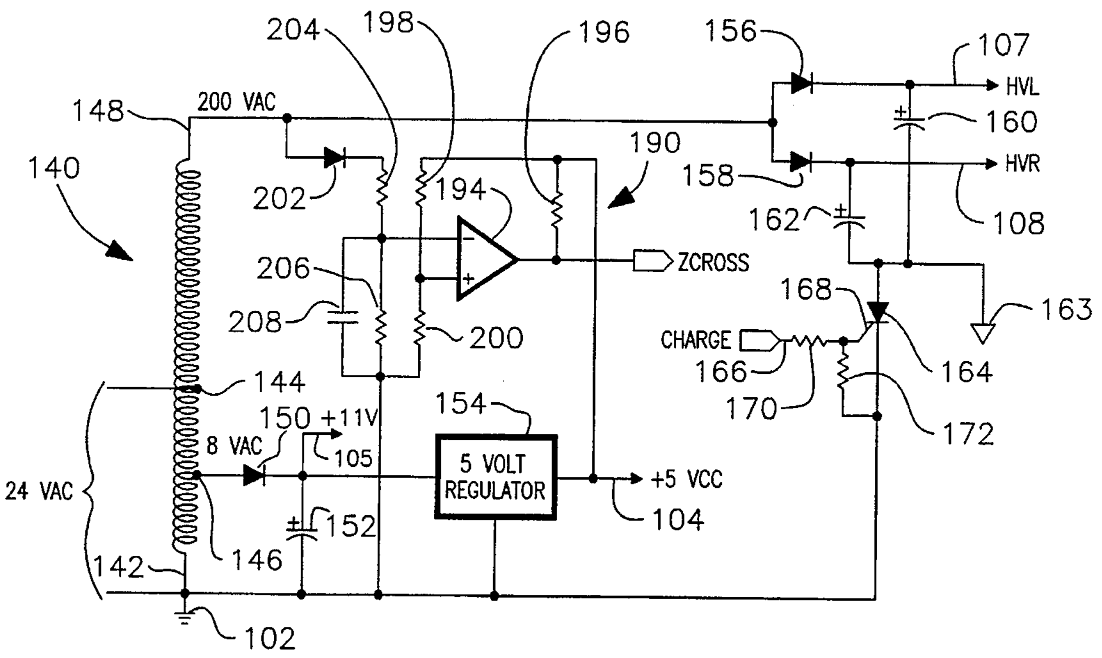
FIG. 2 is an electrical schematic diagram of the power supply circuit of FIG. 1.

Referring now in addition to FIG. 2, the power supply circuit 100 of FIG. 1 more particularly includes an autotransformer 140 having a reference terminal 142 connected to circuit ground 102, a 24 volt RMS AC input tap point 144, an 8-volt RMS AC output tap point 146, and a 200-volt RMS AC output terminal 148.

Conventional low voltage power supply circuitry includes a series rectifier diode 150 connected to the 8-volt AC output tap point 146, a filter capacitor 152, for example a 100 mfd capacitor, and a 5-volt integrated circuit voltage regulator 154, which supplies the 5 volt VCC line 104. The capacitor 152 is charged to approximately +11 volts DC (the peak voltage of half-wave rectified 8-volts RMS AC), and the 11 volts DC line 105 is supplied from the junction of the rectifier diode 150 and the capacitor 152.

For supplying the individual +280 volt DC HVL and HVR lines 106 and 108, individual rectifier diodes 156 and 158 are connected to the 200-volt AC output terminal 148 of the autotransformer 140, and a pair of 100 mfd energy storage capacitors 160 and 162 are connected to the HVL and HVR lines 106 and 108. The energy storage capacitors 160 and 162 during operation are charged to approximately +280 volts DC (the peak voltage of half-wave rectified 200-volts RMS AC), and respectively supply energy for one of the Xenon flash lamps 26, 28 or 30 and one of the Xenon flash lamps 32, 34 or 38, when a pair of the Xenon flash lamps is triggered by one of the trigger circuits 72, 74 or 76, whereupon the capacitors 160 and 162 discharge through the Xenon flash lamps. To provide a discharge current path, a local ground reference 163 is connected to the capacitor 160 and 162 negative terminals.

Preferably, in order to limit current demands on the power source 90 as the energy storage capacitors 160 and 162 are recharged following discharge through the Xenon flash lamps, and to facilitate the system 20 being supplied by the twenty four volt AC power source 90, a variable charge angle technique is implemented, whereby the energy storage capacitors 160 and 162 are gradually recharged. During operation, selected pairs 40, 42 and 44 of the Xenon flash lamps 26, 28, 30, 32, 34 and 36 are triggered approximately once per second, so approximately one second is available for gradual recharge of the energy storage capacitors 160 and 162. Employing this technique, instantaneous current drawn from the power source 90 is limited to approximately 500 ma. Otherwise, instantaneous could exceed several amperes.

More particularly, the charging current path for the energy storage capacitors 160 and 162 includes a silicon controlled rectifier (SCR) 164 connected between the capacitor 160 and 162 negative terminals and circuit ground 102. Triggering of the SCR 164 for gradual charging of the energy storage capacitors 160 and 162 is controlled by the FIG. 1 microcontroller 60 via a CHARGE line 166. The CHARGE line 166 is connected to the gate terminal 168 of the SCR 164 through a resistor 170, and another resistor 172 connected to circuit ground 102 completes the SCR 164 gate circuitry.

Also for purposes of the variable charge angle control, a zero crossing detector circuit generally designated 190 (FIG. 2) drives a ZCROSS line 192, connected as an input to the FIG. 1 microcontroller 60. The zero crossing detector circuit 190 more particularly includes an integrated circuit comparator 194 which, together with an output pull-up resistor 196, drives the ZCROSS line 192. A reference voltage divider including resistors 198 and 200 is connected to the comparator 194 non-inverting (+) input, and instantaneous voltage of the transformer output terminal 148 is sensed via a network including a rectifier diode 202 driving a voltage divider with series resistors 204 and 206 connected to the comparator 194 inverting (−) input. A noise-reduction capacitor 208, for example 0.01 mfd, is connected between the inverting (−) input and circuit ground 102. Via the ZCROSS line 192, the microcontroller 60 is thus able to sense low-to-high transitions of the AC voltage waveform as depicted in FIG. 3, and delay firing of the SCR 164 for a variable amount of time, depicted in FIG. 3 as Delay 1, Delay 2, Delay 3, etc., through Delay n.

Figure 3:
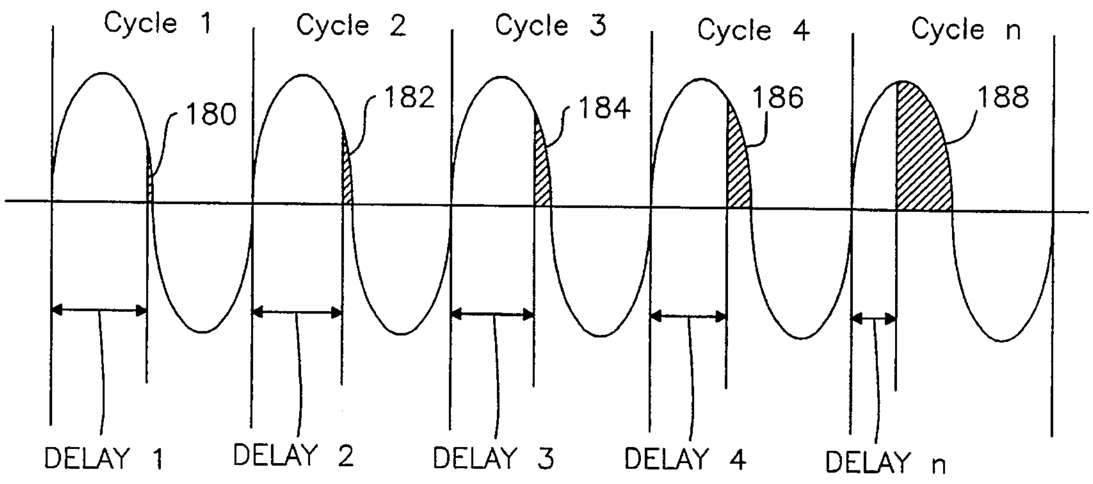
FIG. 3 is a waveform diagram depicting operation of a variable charge angle aspect of the power supply circuit of FIGS. 1 and 2.

Operation of the variable charge angle implementation is represented in the waveform diagram of FIG. 3, wherein successive cycles of the AC voltage waveform at the output terminal 148 are represented as Cycle 1, Cycle 2, etc., through Cycle n, with shaded areas 180, 182, 184, 186 and 188 representing the SCR 164 conducting or 0N time.

Briefly considering operation of the variable charge angle control with reference to FIG. 3, a time constant tc is defined as approximately 35 microseconds, as well as a total time constant ttc of approximately five milliseconds. To establish Delay 1, triggering of the SCR 164 is delayed for a time equal to one-half cycle minus one tc. To establish each successive delay time, an additional one tc is subtracted, until a delay of one-half cycle minus ttc is achieved. Thus, Delay 2 equals one-half cycle minus two tc, and Delay 3 equals one-half cycle minus three tc. In this manner, an initial heavy inrush current to recharge the energy storage capacitors 160 and 162 is avoided following substantial discharge of the capacitors 160 and 162 upon triggering of one of the Xenon flash lamp pairs 40, 42 and 44. Charging continues at a delay of one cycle minus ttc until full charge is achieved. It will be appreciated that the necessary delay timing is readily achieved by appropriate programming of the microcontroller 60.

As a further function of the SCR 164, in order to provide a ground reference for proper operation of the trigger circuits 72, 74 and 76 and of the trigger terminals 84, 86 and 88, triggering is synchronized with low-to-high transitions of the AC voltage wave form at the output terminal 148, and the SCR 164 is simultaneously triggered, all under control of the microcontroller 60 by appropriate programming.

Figure 4:
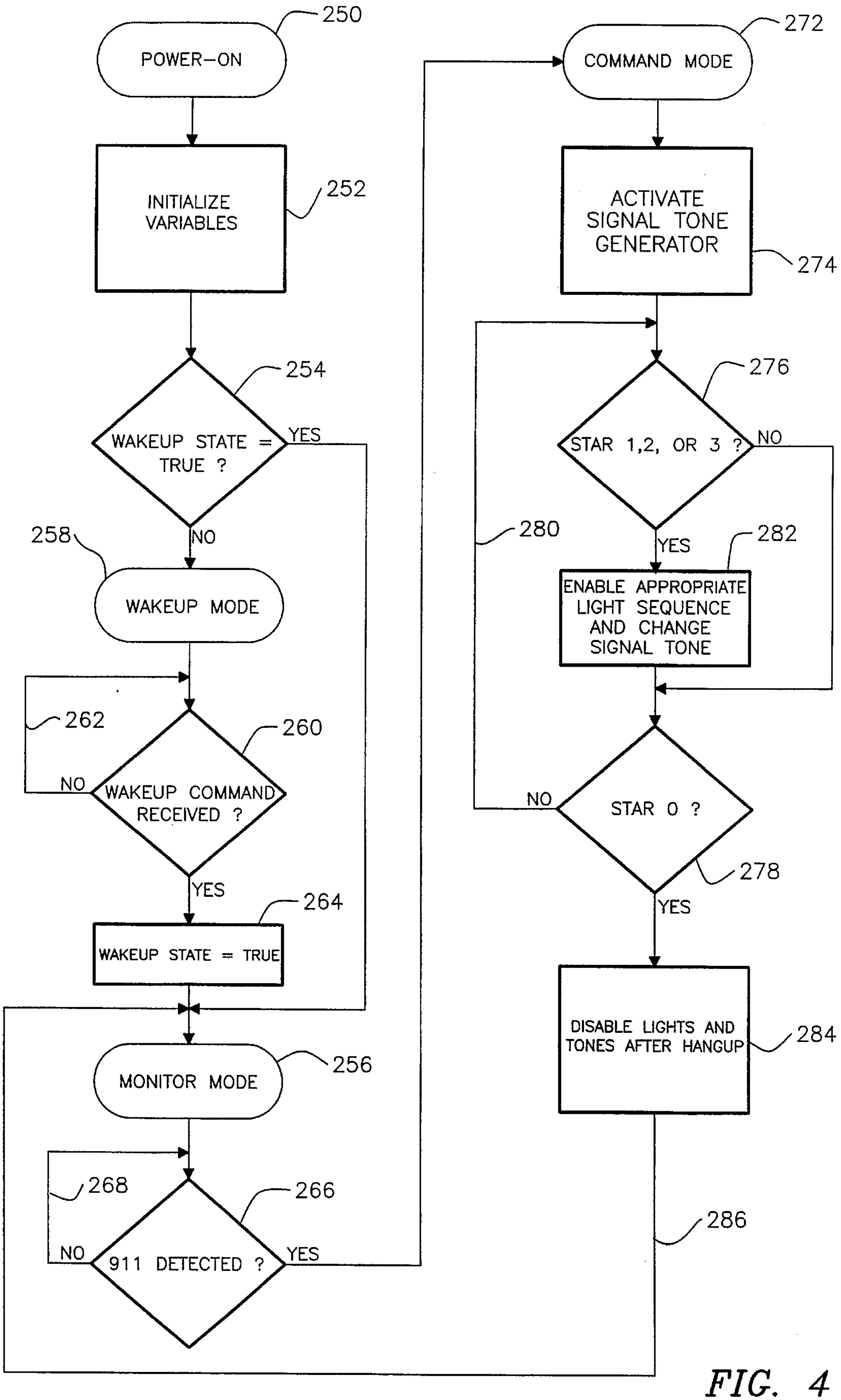
FIG. 4 is a flowchart representing programming within the microcontroller of FIG. 1.

Referring now to FIG. 4, represented in flowchart form is programming within the ROM 64 of the FIG. 1 microcontroller 60 for implementing various functions of the emergency locator light system 20, and more particularly of the electronic circuitry 24 thereof.

In a preferred implementation, in order to enable the manufacturer to maintain registration records of installed systems, and to appropriately communicate with emergency authorities in a particular community regarding each individual installation, the electronic circuitry 24 is subject to a Sleep Mode which is entered upon initial installation and power up. Thus, upon initial installation, the only control command accepted is an initialization command communicated via the telephone line 114 from the manufacturer. Once the system has been initialized, subsequent power up sequences cause the electronic circuitry to immediately enter a Monitor Mode; in other words, Sleep Mode is valid one time only.

Thus, the FIG. 4 flowchart is entered upon power-on reset at 250, and in Box 252 various variables in RAM 62 are initialized. Next, in Decision Box 254, a WAKEUP STATE flag variable is tested via FIG. 1 input port 136 to determine whether the electronic circuitry 24 is in Wakeup Mode or whether Monitor Mode should be entered. While the WAKEUP STATE flag variable could be maintained in a suitable non-volatile RAM, in this particular implementation the blown or not blown state of the FIG. 1 fuse 130 represents the WAKEUP STATE flag variable. Upon initial manufacture, the fuse 130 is not blown, representing a WAKEUP STATE as NOT TRUE. When the fuse 130 is blown, WAKEUP STATE is TRUE. Use of the fuse 130 for this purpose ensures that power interruptions do not disturb the WAKEUP STATE flag variable.

More particularly, if, in Decision Box 254, the WAKEUP STATE flag variable is determined to be TRUE, then execution branches to Monitor Mode represented at Box 256. Otherwise, execution proceeds to Wakeup Mode, represented by Box 258. A wait loop is entered as represented by Decision Box 260 and branch 262, wherein the electronic circuitry 24 is waiting for a predetermined confidential initialization code to be received via the telephone line 114, decoded by the DTMF decoder 120, and input to the microcontroller 60. Upon successful initialization, in Box 264 the FIG. 1 SCR 132 is gated via output port 135 to blow the fuse 130, thus setting the WAKEUP STATE flag to TRUE. Upon subsequent power-on reset sequences, following variable initialization in Box 252, a system enters Monitor Mode represented by execution proceeding from decision Box 254 directly to Box 256.

While in Monitor Mode, the electronic circuitry 24 remains in a wait loop while constantly monitoring the local telephone line 114 for a telephone call to the predetermined telephone number such as "911." Thus, the wait loop is represented by the decision Box 266 and program branch 268. It will be appreciated that this wait loop of decision Box 266 and branch 268 is implemented employing conventional programming techniques, and employs the FIG. 1 off-hook detector 118 and DTMF decoder 120 to sense activity on the local telephone line 114.

For valid recognition of the predetermined telephone number and entry into command mode 272, the dialing tones, for example for "911" must be received in order, and without any prefixes or previous tones entered, once an off-hook condition is detected by the off-hook detector 118. In other words, if the digits "911" are part of a telephone number other than the predetermined emergency telephone number, the dialing is ignored, and the electronic circuitry 24 remains in Monitor Mode.

As noted hereinabove, the electronic circuitry 24 may optionally, while in Monitor Mode 256, respond to a predetermined telephone number, such as "911" being dialed on a rotary dial telephone, although this capability is of increasingly less importance due to the widespread use of tone dialing telephones. Further, while in most cases the predetermined emergency telephone number such as "911" will be dialed on an ordinary telephone set, in some cases automatic alarm equipment may dial a predetermined telephone number and deliver a recorded message. While in Monitor Mode, the circuitry 24 responds to such dialing from any telephone set or automatic equipment.

When the dialing of the predetermined telephone number is detected, program execution proceeds as indicated by line 270 to enter command mode, as represented by Box 272.

Upon entry into the Command Mode 272, the electronic circuitry 24 becomes responsive to predetermined tone dialing signal sequences, i.e. "Star Codes", to activate the signal light device 22.

More particularly, upon entry into Command Mode 272, flowchart Box 274 is entered whereupon the signal tone generator is activated to signal the presence of the emergency locator signal light system 20 to an emergency telecommunicator. For example, a brief tone of approximately 1,000 Hertz is generated every five seconds through appropriate programming of the microcontroller 60 to generate a square wave signal at output port 128, which signal is then smoothed by the tone insertion filter 126.

In Command Mode, the electronic circuitry 24 waits for and is responsive to one or more predetermined tone dialing signal sequences (Star Codes) to activate the signal light device 22, as is represented by Decision Boxes 276 and 278, and an associated wait loop 280. Thus, Decision Box 276 represents waiting for a Star Code of "*1", "*2" or "*3", which respectively indicate a medical alert signal, a fire alert signal and a police alert signal. Upon the detection of one of these Star Codes, Box 282 is entered, whereupon the signal light device 22 is activated to emit the corresponding flash light sequence through appropriate programming which drives the trigger circuits 72, 74 and 76 via the microcontroller 60 output ports 66, 68 and 70.

More particularly, and by way of example, in the event the Star Code "*1" is received, indicating a medical alert, the red pair 44 and white pair 40 of flash lamps are activated. The white flash lamp pair 40 flashes first, with the red flash lamp pair 44 flashing one second later. Then, one second later, the red pair lamps 44 flash again. One second after that, the white lamp pair 40 flashes again. This cycle continues, until the electronic circuitry 24 receives a reset command.

In the event the Star Code "*2" is received, indicating a fire alert command, in this example the white pair of lamps 44 flash every three seconds, until the electronic circuitry 24 receives a reset command.

Finally, in the event the Star Code "*3" is received, indicating a police alert command, in this example the blue pair 42 and the white pair 40 of lamps flash. The white lamp pair 40 flashes first, with the blue lamp pair 42 flashing one second later. Then, one second later, the blue lamp pair 42 flashes again, and one second after that the white lamp pair 40 flashes. This cycle continues until the electronic circuitry 24 receives a reset command.

Significantly, when in the Command Mode 272, the Star Codes can be entered on any telephone set (or other equipment) connected to the telephone line, including the emergency telecommunicator's equipment.

As another function performed in Box 282, after execution of any Star Command, the signal tone generator comprising the tone insertion filter 126 changes in audible characteristic, for example, reducing the interval between 1,000 Hertz tones to once every twenty seconds.

Once the signal light device 22 has been activated, the lamps continue to flash even though the telephone line is hung up, until a reset command is issued, which in this example is a special "Star Code" specifically, "*0". Thus, when dialing of "*0" is detected in Decision Box 278, Box 284 is entered, wherein the signal light device 22 is deactivated. The specific programming in Box 284 may also monitor the on-hook/off-hook status of the telephone line 114, and wait until the local telephone set is on-hook before completing reset activities. Execution then proceeds via program branch 286 back to Monitor Mode 256.

With reference now to FIGS. 5–14, although the signal light device 22 and the electronic circuitry 24 may be physically separate, advantageously the entire emergency locator signal light system 20 of FIG. 1 is a self-contained unit, including a housing 300. In the illustrated embodiment, the housing 300 comprises upper and lower injection-molded halves 302 and 304 comprising for example injection-molded translucent white Lexan® plastic Type No. 943A. Secured to the upper housing half 302 is a mounting piece, which threadably receives a conventional electrical conduit mounting 308. Illustrated housing 300 is thus intended to be mounted by the conduit 308, for example, below the eaves of a house or building. It will be appreciated that a variety of other mounting arrangements may be employed (not illustrated), such as rear mounting and a semi-flush mount by means of a flange 310,312, molded as part of the housing halves 302 and 304. Similarly, it will be appreciated that other forms of housing construction may be employed, such as dividing the housing into front and rear portions, rather than upper and lower portions.

Figure 11:
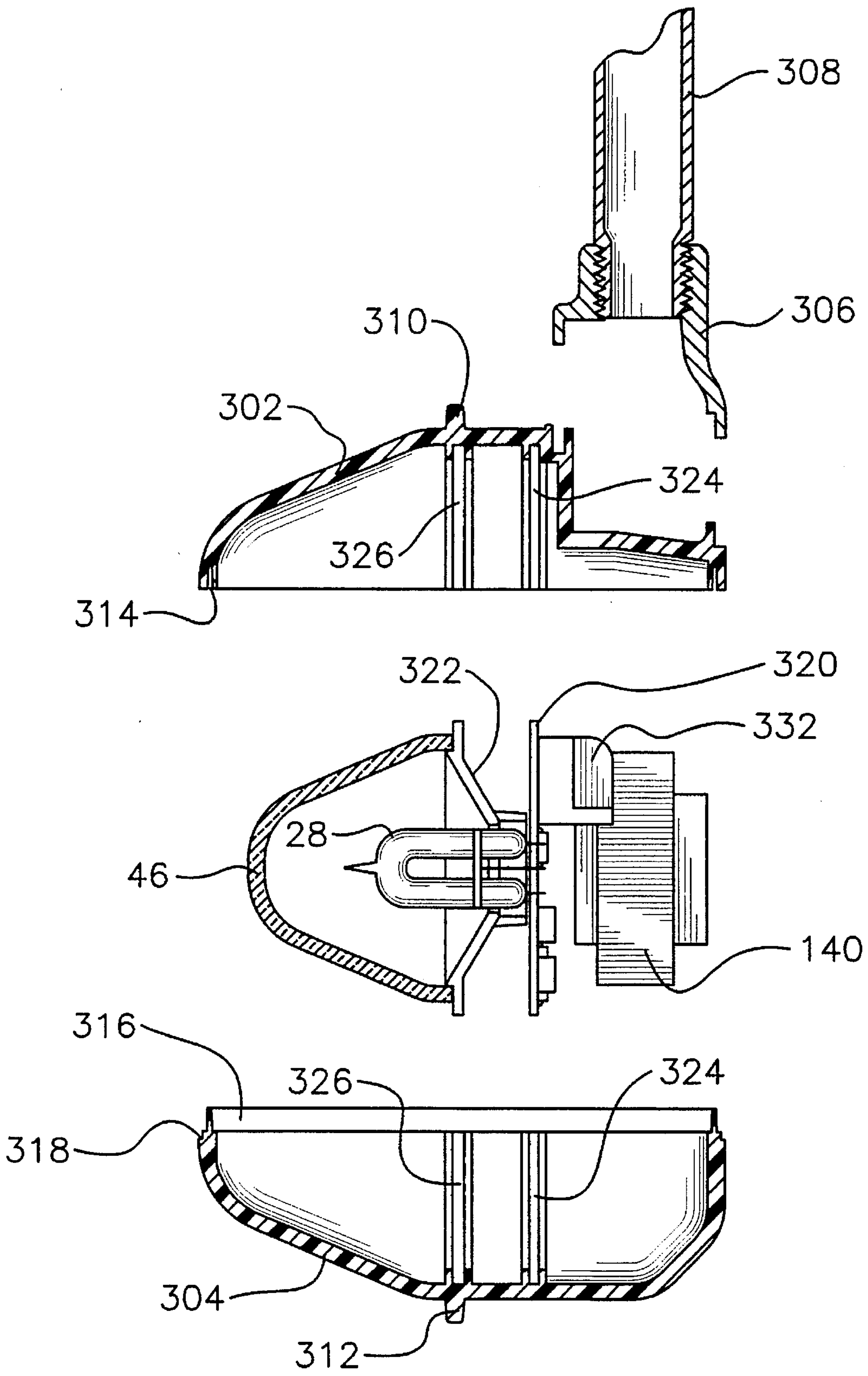
FIG. 11 is an exploded side view, partly in section, taken generally on line 11—11 of FIG. 10.

As best seen in FIG. 11, the upper housing half 302 includes a slot 314 along its lower edge, and the lower housing half 304 includes a corresponding flange 316 which mates with the slot 314, with a step 318 just below the flange 316 to improve the appearance at the interface between the upper and lower housing halves 302 and 304. It will be appreciated that when the housing 300 is assembled and the upper and lower housing halves 302 and 304 are secured together by means of mounting screws (not shown) that rain water is prevented from entering the interior of the housing 300.

Still referring to FIG. 11, secured within the housing 300 are a printed circuit board 320 and a reflector 322, retained within respective grooves 324 and 326 around the inside of the housing halves 302 and 304. The reflector 322 comprises injection-molded plastic, and includes a suitable highly reflective coating, such as is commonly employed in flashlights.

Figure 12:
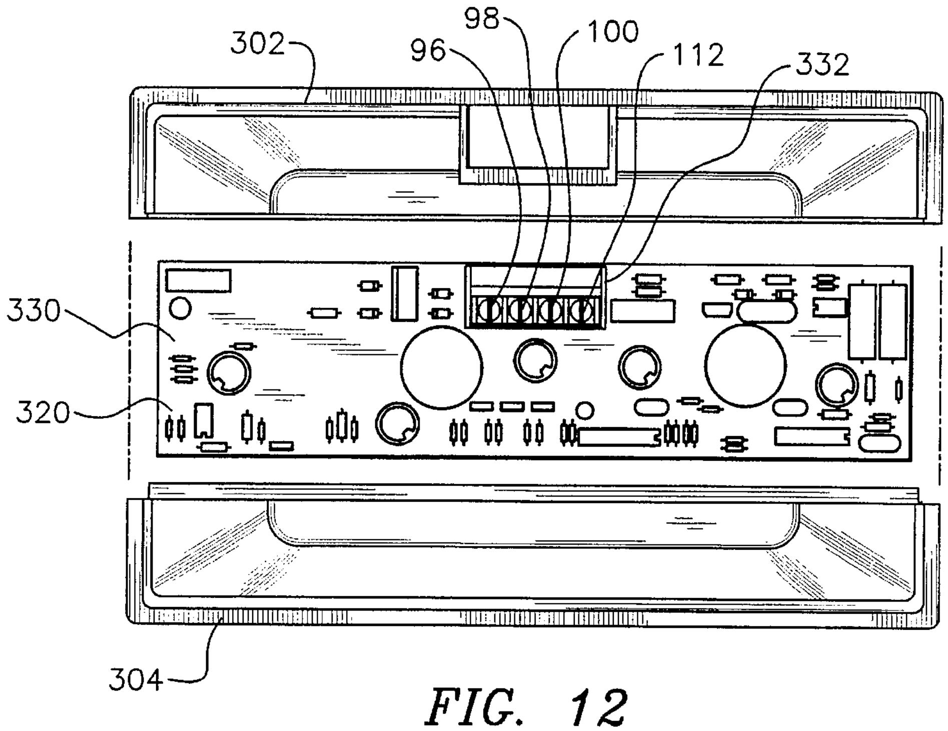
FIG. 12 is an exploded rear view of the unit of FIG. 5.
Figure 13:
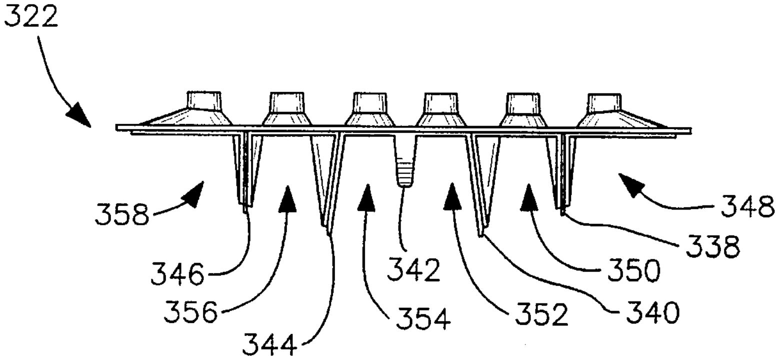
FIG. 13 is a top plan view of a reflector within the unit of FIG. 5.
Figure 14:
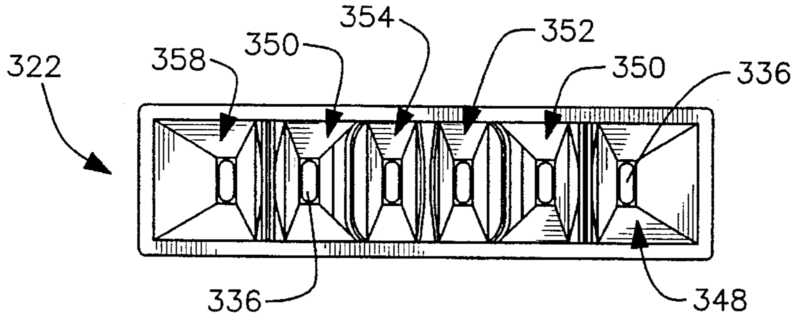
FIG. 14 is a front elevational view of the FIG. 13 reflector.

Mounted to the circuit board 320 rear side 330 are various components of the electronic circuitry 24, perhaps best seen in FIG. 12, including a connector block 332 which supports the screw terminal connectors 96, 98, 100 and 112, as well as the autotransformer 140. Depending upon the particular components employed, it may be more convenient to have the autotransformer 140 connected to the circuit board 320 by means of an appropriate connector (not shown), rather than being directly soldered.

The Xenon flash lamps 26, 28, 30, 32, 34 and 36 are mounted to the front side 334 of the circuit board 320, slightly recessed within cavities 336 of the reflector 322.

The reflector 322 more particularly has five partitions 338, 340, 342, 344 and 346 defining interior spaces 348, 350, 352, 354, 356 and 358 for the individual Xenon flash lamps 26, 28, 30, 32, 34 and 36, respectively. To produce the appropriate colors, the red lenses 50 and 52 surround the interior spaces 348 and 358 of the end flash lamps 26 and 36, while the blue lenses 46 and 48 surround the interior spaces of the intermediate flash lamps 28 and 34.

It will be seen that the six flash lamps extend generally in a row, with the red flash lamps 26 and 36 being on the end and comprising one operational pair, the blue flash lamps 28 and 34 mounted inside the red flash lamps 26 and 26 respectively, and the white flash lamps 30 and 32 mounted in the center.

The portion of the housing 300 in front of the flange 310,312, comprising parts of both the upper and lower halves 302 and 304, defines a translucent outer lens 360, which covers the blue and red lenses 46,48 and 50,52. The housing 300 rear portion 362 is also inherently of the same translucent material since each of the halves 302 and 304 is a single injection molded piece. However, light from the flash lamps 26, 28, 30, 32 and 36 is substantially all directed towards the translucent outer lens 360 by the reflector 322, and is thus not visible through the housing 300 rear portion 362.

Figure 5:
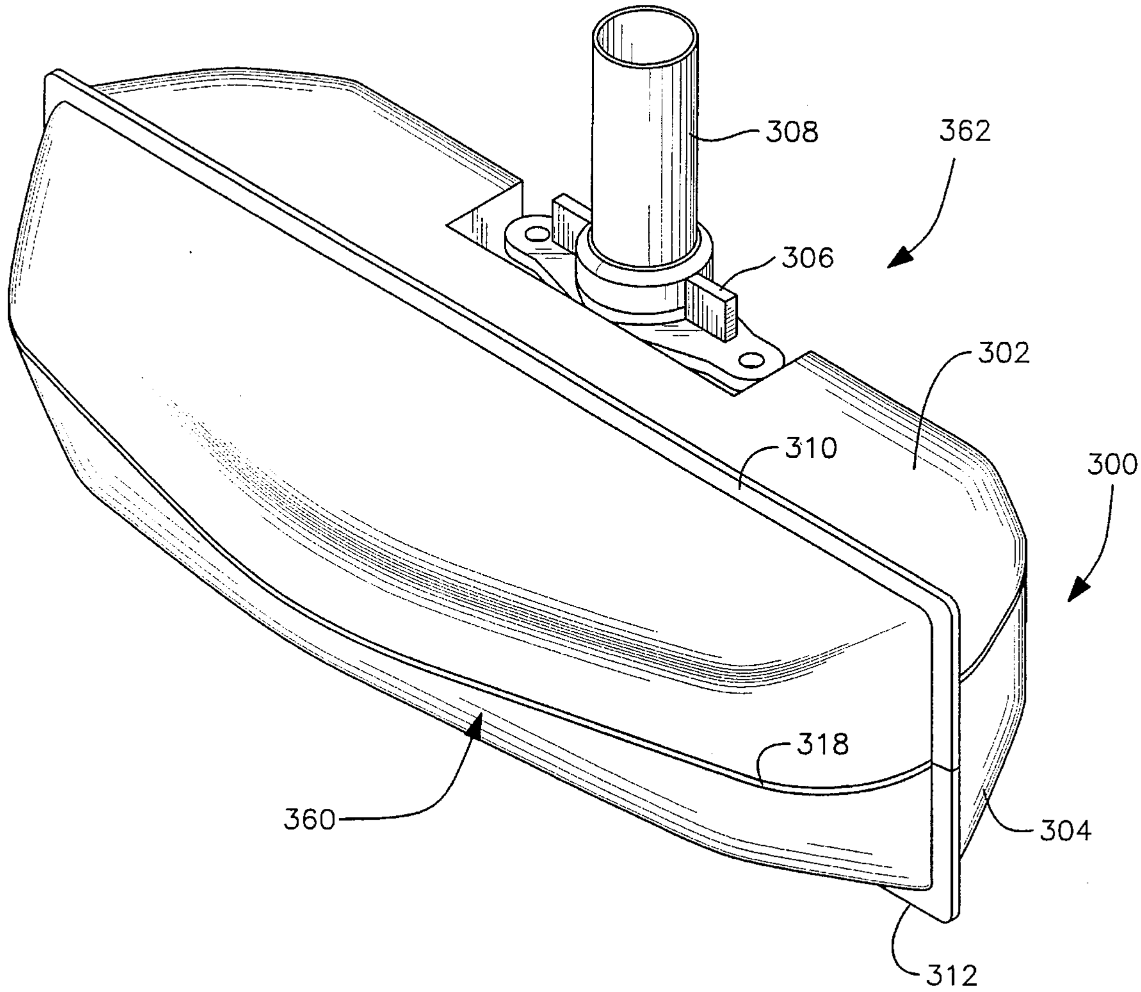
FIG. 5 is a perspective view showing the mechanical details of an emergency locator signal light system in the exemplary form of a self-contained unit integrating the signal light device with electronic circuitry.
Figure 6:
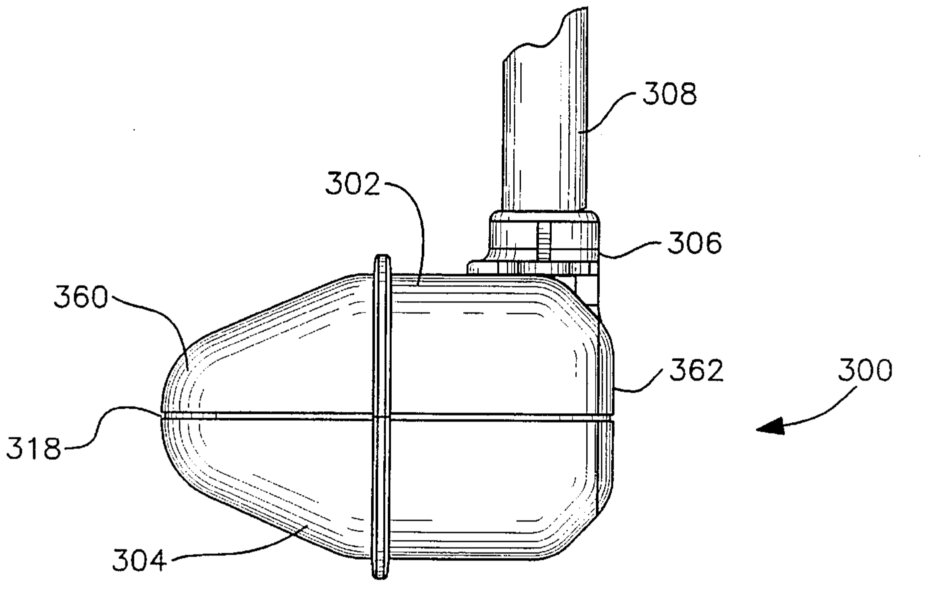
FIG. 6 is a side elevational view of the housing of the unit of FIG. 5.
Figure 7:
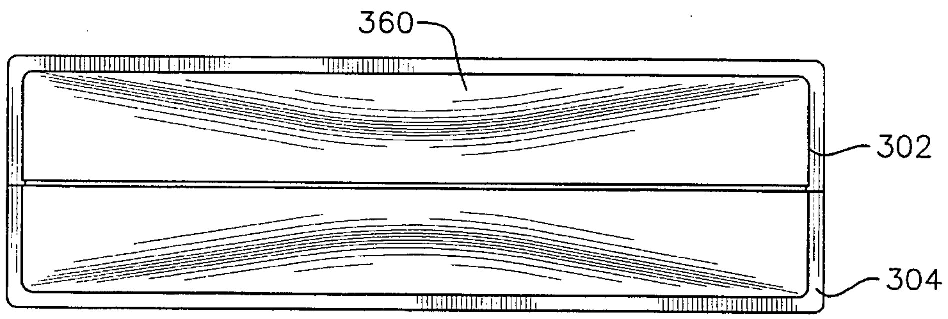
FIG. 7 is a front elevational view of the housing of the unit of FIG. 5, with the mounting removed.
Figure 8:
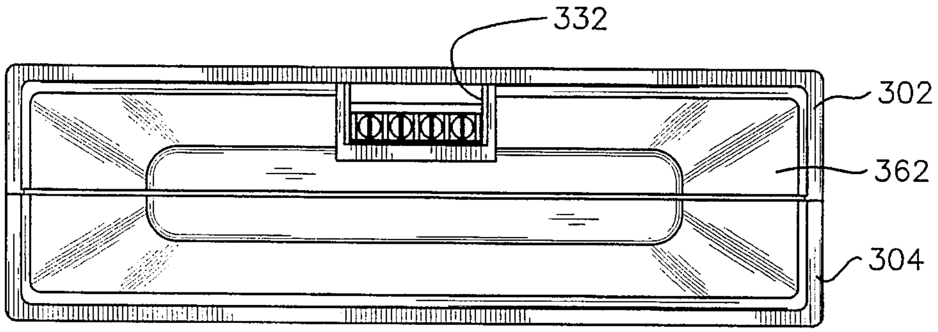
FIG. 8 is rear elevational view of the housing of the unit of FIG. 5, with the mounting removed.
Figure 9:
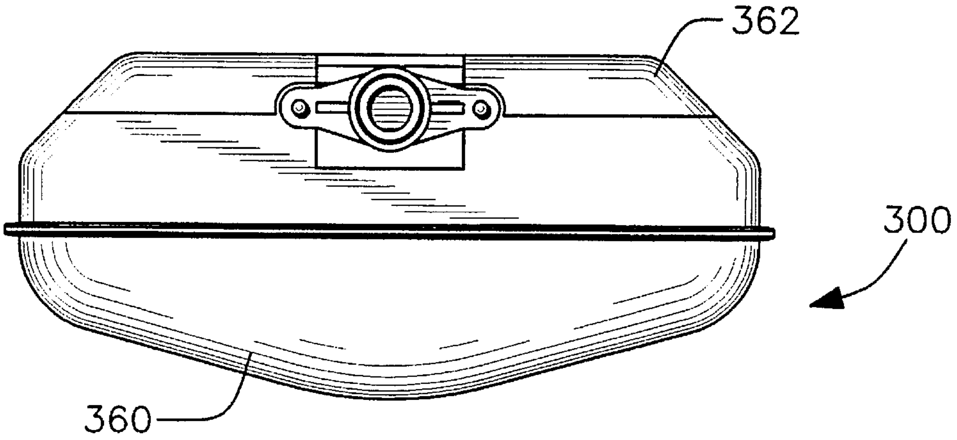
FIG. 9 is a top view of the housing of the unit of FIG. 5.
Figure 10:
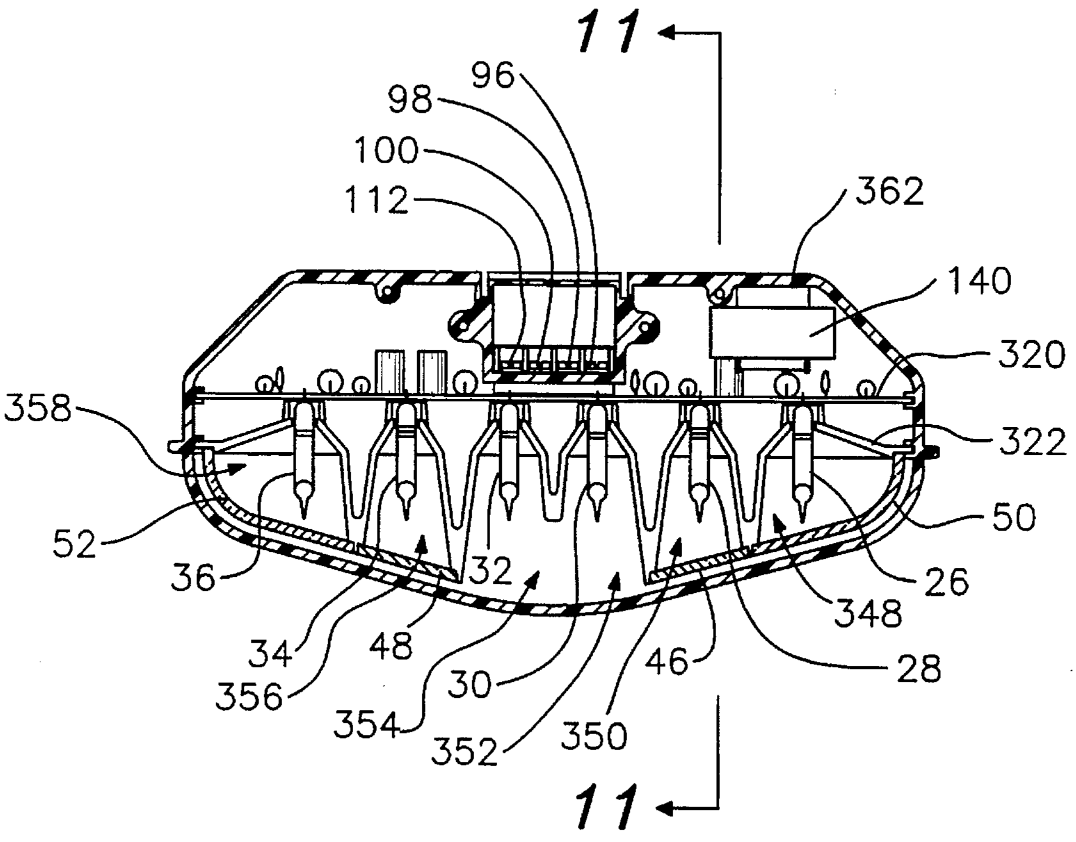
FIG. 10 is a top view, partly in section, showing the internal arrangement of the unit of FIG. 5.

Preferably, in order to provide good visibility of the various colors from either the side or the front of the housing 300, the translucent outer lens 360 projects farther out in the middle than at the ends, as is best seen in FIGS. 5, 9 and 10. While the particular lens configuration illustrated has a curved profile, it will be appreciated that other profiles may be employed as well, such as a profile which has discrete steps.

Figure 15:
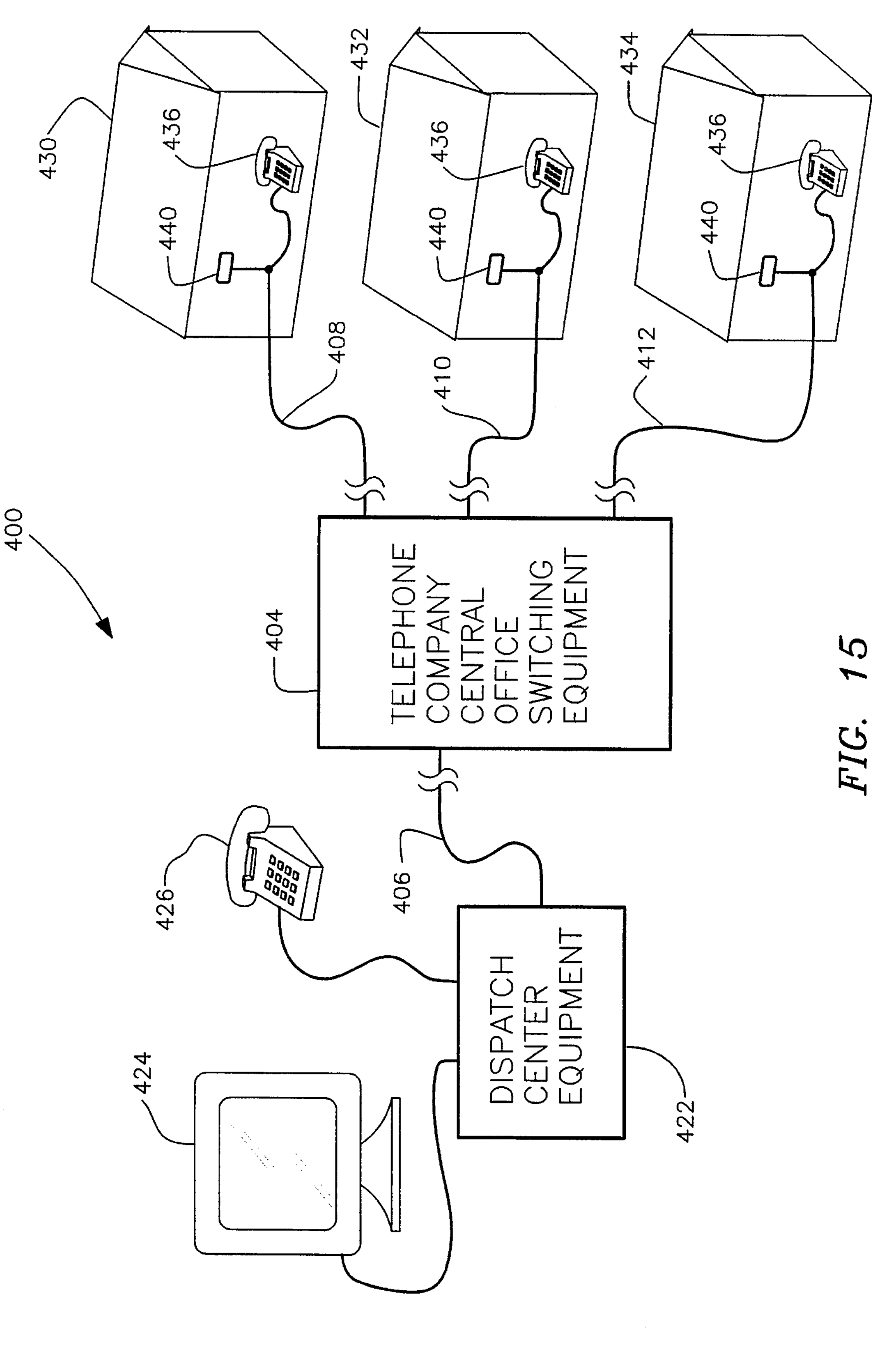
FIG. 15 is a block diagram representation of an overall emergency response system embodying the invention.

Referring finally to FIG. 15, depicted in block diagram form is a comprehensive emergency response system 400 illustrating the manner in which a number of emergency locator signal light systems such as the system 20 of FIG. 1 are employed in combination. The emergency response system 400 includes a publicly accessible switched telephone system 402 comprising telephone company central office switching equipment 404, and representative individual telephone lines 406, 408, 410 and 412.

The system 400 also includes a telecommunications center 420 including emergency operator telephone equipment 422 connected to a video display device 424 and to a representative dialing telephone set 426. The equipment 422 is connected via the telephone line 406 to the central office switching equipment 404. In a typical enhanced system, the display system 424, including the dispatch center equipment 422 is programmed to display to an emergency telecommunicator the location that an emergency telephone call originates from. In accordance with the invention, the display system 424 is also programmed to alert an emergency operator or telecommunicator that a particular individual subscriber system is equipped with an emergency locator signal light system, such as the FIG. 1 system 20.

Finally, the emergency response system 400 additionally includes a plurality of individual telephone subscriber systems at various subscriber locations, represented by houses 430, 432 and 434. The subscriber locations represented by the houses 430, 432 and 434 are connected via respective telephone lines 408, 410, 412 to the central office switching equipment 404 whereby telephone calls may be placed to the emergency telecommunications center 420.

Within each of the houses 430, 432 and 434 is local telephone equipment connected to the respective local telephone lines 408, 410 or 412 for placing telephone calls, and an emergency locator signal light system 440, such as the FIG. 1 system 20, mounted on the exterior of the house 430, 432 or 434 for the signalling purposes described hereinabove.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An emergency locator signal light system comprising:

a signal light device; and electronic circuitry responsive to dialing signals on a telephone line and having at least a monitor mode and a command mode, said electronic circuitry when in the monitor mode being responsive to the dialing of a predetermined telephone number to initiate the command mode, and said electronic circuitry when in the command mode being responsive to a predetermined tone dialing signal sequence to activate said signal light device.

2. The emergency locator signal light system of claim 1, wherein said electronic circuitry when in the command mode is responsive to a predetermined tone dialing signal sequence beginning with a tone dialing signal corresponding to a non-numerical character.

3. The emergency locator signal light system of claim 2, wherein the non-numerical character is the "*" character.

4. The emergency locator signal light system of claim 1, wherein said electronic circuitry when in the monitor mode is responsive to the dialing of "911" to initiate the command mode.

5. The emergency locator signal light system of claim 1, wherein said electronic circuitry is responsive to the predetermined tone dialing signal sequence being generated either by local telephone equipment connected to the telephone line locally with reference to said system, or by remote telephone equipment connected to the telephone line through central office switching equipment.

6. The emergency locator signal light system of claim 5, wherein said electronic circuitry is responsive to the predetermined tone dialing signal generated by remote telephone equipment comprising emergency operator equipment.

7. The emergency locator signal light system of claim 1, wherein said electronic circuitry includes a signal tone generator connected to the telephone line to signal the presence of said system, and wherein said electronic circuitry when in the monitor mode is responsive to the dialing of the predetermined telephone number to also activate said signal tone generator.

8. The emergency locator signal light system of claim 7, wherein said electronic circuitry when in the command mode is responsive to the predetermined tone dialing signal sequence to also change an audible characteristic of said signal tone generator.

9. The emergency locator signal light system of claim 1, wherein:

said signal light device is capable of emitting at least two distinct light signals; and wherein said electronic circuitry when in the command mode is selectively responsive to at least two different tone dialing signal sequences corresponding respectively to the at least two distinct light signals to selectively activate said signal light source to emit a corresponding light signal.

10. The emergency locator signal light system of claim 9, wherein said electronic circuitry is responsive to the predetermined tone dialing signal sequence being generated by remote telephone equipment comprising emergency operator equipment connected to the telephone line through central office switching equipment, whereby an emergency operator can selectively initiate one of said at least two distinct light signals.

11. The emergency locator signal light system of claim 9, wherein said signal light device is capable of selectably emitting:

a light signal comprising blue and white lights flashing alternately in response to a tone dialing sequence representing a Police Alert command;

a light signal comprising red and white lights flashing alternately in response to a tone dialing sequence representing a Medical Alert command; and a light signal comprising a flashing white light in response to a tone dialing sequence representing a Fire Alert command.

12. The emergency locator signal light system of claim 9, wherein said signal light device comprises six flash lamps extending generally in a row, the two end flash lamps comprising an end operational pair, the two flash lamps adjacent the end flash lamps comprising an intermediate operational pair, and the center two flash lamps comprising a center operational pair, two of said operational pairs of flash lamps having colored lenses to distinguish between the operational pairs.

13. The emergency locator signal light system of claim 12, wherein said flash lamps extend generally in a horizontal row and wherein said signal light device comprises a housing having a translucent outer lens which projects farther out over said center operational pair of flash lamps than over said intermediate operational pair of flash lamps, and farther out over said intermediate operational pair of flash lamps than over said one operational pair of flash lamps, such that illumination from said flash lamps is visible both from in front of said signal light device and from the sides of said signal light device.

14. An emergency response system comprising, in combination:

a publicly accessible switched telephone system;

emergency operator telephone equipment at a center connected for receiving emergency telephone calls through said switched telephone system; and a plurality of individual telephone subscriber systems at various subscriber locations, each of said subscriber systems including:

a local telephone line connected to said publicly accessible switched telephone system, local telephone equipment connected to the local telephone line for placing telephone calls, and an emergency locator signal light system including a signal light device, and electronic circuitry responsive to dialing signals on the local telephone line and having at least a monitor mode and a command mode, said electronic circuitry when in the monitor mode being responsive to the dialing by said local telephone equipment of a predetermined telephone number for the center to initiate the command mode, and said electronic circuitry when in the command mode being responsive to a predetermined tone dialing signal sequence to activate said signal light device.

15. The emergency response system of claim 14, wherein said emergency operator telephone equipment includes a display system programmed to alert an emergency operator that a particular telephone subscriber system is equipped with an emergency locator signal light system.

16. The emergency response system of claim 14, wherein at each of the subscriber locations said electronic circuitry includes a signal tone generator connected to the telephone line to signal the presence of said emergency locator signal light system, and wherein said electronic circuitry when in the monitor mode is responsive to the dialing of the predetermined telephone number to also activate said signal tone generator.

17. The emergency response system of claim 14, wherein at each of the subscriber locations:

said signal light device is capable of emitting at least two distinct light signals; and wherein said electronic circuitry when in the command mode is selectively responsive to at least two different tone dialing signal sequences corresponding respectively to the at least two distinct light signals to selectively activate said signal light source to emit a corresponding light signal.

18. The emergency response system of claim 17, wherein at each of the subscriber locations said electronic circuitry is responsive to the predetermined tone dialing signal sequence being generated by remote telephone equipment comprising emergency operator equipment connected to the local telephone line through central office switching equipment, whereby an emergency operator can selectively initiate one of said at least two distinct light signals.

19. An emergency locator signal light system comprising:

a signal light device capable of emitting at least two distinct light signals; and electronic circuitry responsive to dialing signals on a telephone line and having at least a monitor mode and a command mode, said electronic circuitry when in the monitor mode being responsive to the dialing of a predetermined telephone number to initiate the command mode, and said electronic circuitry when in the command mode being responsive to at least one predetermined tone dialing signal sequence to select a particular one of the distinct light signals of the signal light device.

20. The emergency locator signal light system of claim 19, wherein one of the distinct light signals serves as a warning to exercise caution, and another of the distinct light signals indicates that assistance would be useful.

21. The emergency locator signal light system of claim 19, wherein said electronic circuitry is responsive to the predetermined tone dialing signal sequence being generated by remote telephone equipment comprising emergency operator equipment connected to the telephone line through central office switching equipment.

* * * * *